United States Patent [19]

Yamamoto et al.

[11] Patent Number: 5,335,563
[45] Date of Patent: Aug. 9, 1994

[54] FOOT-OPERATED PARKING BRAKES FOR CARS AND ONE-WAY DAMPERS FOR USE THEREIN

[75] Inventors: Katsuhiko Yamamoto, Aki; Masamitsu Kojima, Fujisawa; Kazuo Kato, Yamato, all of Japan

[73] Assignees: Kuroishi Iron Works Co., Ltd., Hiroshima; Oiles Corporation, Tokyo, both of Japan

[21] Appl. No.: 963,757

[22] Filed: Oct. 20, 1992

[30] Foreign Application Priority Data

| Oct. 29, 1991 | [JP] | Japan | 3-311983 |
| Apr. 9, 1992 | [JP] | Japan | 4-117948 |
| Sep. 1, 1992 | [JP] | Japan | 4-257513 |

[51] Int. Cl.⁵ .............................................. G05G 1/14
[52] U.S. Cl. ......................................... 74/512; 74/560; 74/531; 188/290; 188/291; 192/12 BA
[58] Field of Search .............. 74/512, 560, 531, 575; 188/291, 290, 77 W, 271; 192/12 BA, 57

[56] References Cited

FOREIGN PATENT DOCUMENTS

| 3816976A1 | 12/1988 | Fed. Rep. of Germany | 74/512 |
| 4023876 | 1/1992 | Fed. Rep. of Germany | 74/512 |
| 60-180021 | 11/1985 | Japan | 74/512 |
| 61-54961 | 4/1986 | Japan | 74/512 |
| 62-216847 | 9/1987 | Japan | 74/512 |
| 63-106161 | 5/1988 | Japan | 74/512 |
| 63-134866 | 9/1988 | Japan | 74/512 |
| 63-306957 | 12/1988 | Japan | 74/512 |
| 2-179574 | 7/1990 | Japan | 74/512 |
| 3-161814 | 7/1991 | Japan | 74/512 |
| 4-39149 | 2/1992 | Japan | 74/512 |
| 4-50064 | 2/1992 | Japan | 74/512 |
| 4-232156 | 8/1992 | Japan | 74/512 |
| 4-232157 | 8/1992 | Japan | 74/512 |
| 2251289 | 7/1992 | United Kingdom | 74/512 |

OTHER PUBLICATIONS

Patent Abstracts of Japan vol. 010, No. 176 (M-491) Jun. 1986 JP-A-61 024 850 Feb. 1986.

*Primary Examiner*—Vinh T. Luong
*Attorney, Agent, or Firm*—Nixon & Vanderhye

[57] ABSTRACT

A one-way damper comprising, one forming member for forming an accommodating chamber, other forming member disposed opposite to the one forming member such that the one and other forming members form the accommodating chamber therebetween and the other forming member is rotatable relative to the one forming member, a coil spring wound around the other forming member, and a viscous fluid accommodated in the chamber.

7 Claims, 14 Drawing Sheets

FOOT-OPERATED PARKING BRAKES FOR CARS AND ONE-WAY DAMPERS FOR USE THEREIN

BACKGROUND OF THE INVENTION

The present invention relates to foot-operated parking brakes for cars and one-way dampers for use therein.

As parking brakes of this type, manual and foot-operated ones have recently been used. A foot-operated brake is generally provided with a brake pedal, a ratchet mechanism which holds the position of the brake pedal when the pedal is stepped down and a return spring which returns the pedal to its home position when the ratchet mechanism is released.

Some cars use a foot-operated brake including a combination of the above mechanism and a shock absorber type damper which includes a piston and a cylinder which accommodates the piston so that impacts occurring when the brake pedal is returned by the return spring to its home position are dampened to thereby prevent the generation of foreign noise due to rapid return of the pedal. Such damper is required to be disposed between the pedal arm and the chassis, so that the space around the pedal is small disadvantageously. A damper for use in the parking brake must be a one-way one which exhibits a sufficiently small resistance to the stepping-down of the brake pedal and which exhibits a desired damping force when it is returned. Provision of such function to the conventional shock absorber type damper renders same relatively expensive.

Since the ratchet mechanism used for the foot-operated parking brake is constructed such that the position of the pedal arm is kept by engaging a lock tooth with a ratchet tooth, foreign noise would be produced due to engaging noise produced when the lock tooth is engaged with the ratchet tooth. In such ratchet mechanism, the ratchet and lock teeth would necessarily be worn, so that unless sufficient measures are taken, desired durability and reliability may not be obtained.

It is therefore an object of the present invention to provide a one-way damper which does not occupy so large an area in a car where installed, provides a sufficient space around the brake pedal, and exhibits sufficiently low resistance to the stepping-down of the brake and a desired damping force when the pedal is returned, using a simple structure, and a foot-operated parking brake for a car, using the damper.

It is another object of the present invention to provide a foot-operated parking brake for a car which produces reduced foreign noise and improves durability and reliability.

SUMMARY OF THE INVENTION

According to the present invention, the above objects are achieved by a one-way damper for use in a foot-operated parking brake, the damper comprising, one forming member for forming an accommodating chamber, other forming member disposed opposite to the one forming member such that the one and other forming members form the accommodating chamber therebetween and the other forming member is rotatable relative to the one forming member, a coil spring wound around the other forming member, and a viscous fluid accommodated in the chamber.

According to the present invention, the above objects are achieved by a foot-operated parking brake for a car, using the above one-way damper, a foot-operated parking brake for a car, using the one-way damper, wherein a brake pedal is urged by a return spring so as to be returned to home position thereof by a resiliency of the return spring, the coil spring being connected at one end thereof to one of the brake pedal and a frame, the one forming member being connected to other of the brake pedal and the frame, a direction of winding of the coil spring being so set that in a stroke of stepping-down of the brake pedal the coil spring slides relative to the other forming member while in a stroke of return of the brake pedal to the home position the coil spring contacting the other forming member with high frictional resistance.

According to the present invention, the above objects are achieved by a foot-operated parking brake for a car, comprising, a frame, a brake pedal attached rotatably to the frame, one forming member fixed to the frame for forming an accommodating chamber, other forming member disposed rotatably relative to the one forming member and forming the accommodating chamber in association with the one forming member, a viscous fluid accommodated in the accommodating chamber, a first coil spring connected at one end thereof to the brake pedal and disposed at the other forming member, a winding direction of the first coil spring being so set that in a stroke of stepping-down of the brake pedal the first coil spring slides relative to the other forming member while in a stroke of return of the brake pedal to a home position the first coil spring contacts the other forming member with high frictional resistance, a second coil spring connected at one end thereof to the frame and disposed at the brake pedal, a winding direction of the second coil spring being so set that in the stroke of the stepping down of the brake pedal the second coil spring loosely contacts the brake pedal while in the stroke of the brake pedal return to the home position the second coil spring contacts the brake pedal with high frictional resistance, a return spring stretched between the frame and the brake pedal to return the brake pedal to the home position by a resiliency of the return spring, and release means for releasing a contact of the second coil spring to the brake pedal with high frictional resistance.

In one aspect of the present invention, the one forming member comprises an outer cylinder while the other forming member comprises an inner cylinder disposed at an inner peripheral surface of the outer cylinder so as to form the chamber between the inner peripheral surface of the outer cylinder and an outer peripheral surface of the inner cylinder, wherein the coil spring is wound around an inner peripheral surface of the inner cylinder.

In another aspect of the present invention, the one forming member comprises an inner cylinder and the other forming member comprises an outer cylinder disposed at an outer peripheral surface of the inner cylinder so as to form the accommodating chamber between an inner peripheral surface of the outer cylinder and the outer peripheral surface of the inner cylinder, wherein the coil spring is wound around an outer peripheral surface of the outer cylinder.

As will be obvious from this example, disposition of a coil spring in the present invention is to wind the coil spring externally around the other forming member, in other words, to dispose the coil spring along the outer peripheral surface of the other forming member and, if the other forming member is a cylindrical member having an inner peripheral surface such as the inner cylinder, to dispose a coil spring internally on the other forming member, in other words, to dispose the coil spring along the inner periphery of the other forming member. In the present invention, the forming members each is not limited to cylindrical member such as the outer and inner cylinders and includes disc-like members or column-like members. The forming members may be made of a metal, and preferably, of a synthetic resin for lightening purposes.

In order to mainly use a viscous shearing resistance of the viscous fluid accommodated in the accommodating chamber to obtain a damping action, the accommodating chamber is preferably formed such that the viscous fluid expands very thin like a film. As an example, the chamber can have a thickness of 0.05–1 mm. In the case of a fluid with high viscosity, it may have a thickness of more than 1 mm. If the chamber has sufficiently high mechanical dimensional accuracies, it may have a thickness of less than 0.05 mm. The opposite surfaces of the forming members which form the accommodating chamber are preferably flat without unevenness, but may have unevenness from a standpoint of holding the viscous fluid securely in a relative rotation of both the forming members. While the accommodating chamber may be a ring, disc or cylinder in the shape thereof, it may include a plurality of ring-like, disc-like or cylindrical sectional chambers disposed in coaxial or parallel relationship and being independent of, or communicated with, each other.

The viscous fluid accommodated in the accommodating chamber has preferably a high viscosity so as to provide enough viscous resistance and especially, a viscous shearing resistance. It also is preferably an unfrozen fluid which acts in a sufficiently stable manner even in a cold region. An example of such fluids is a silicone oil. The fluid preferably contains no air mixed therein. Thus, it is not especially required so as to be filled in the accommodating chamber without any air spacing, but is preferably filled completely in the chamber.

The coil spring in the present invention may be increased or decreased in diameter by a rotation of the other forming member or pedal arm relative to the coil spring. Thus the coil spring may be made of coils formed with such a close pitch that the coils contact one to the other. The cross section of wires of the coil spring is not required to be circular. For example, it may be rectangular.

In one example of the present invention, the frame has a solid or hollow cylindrical shaft. If the shaft is solid, the one forming member may be embodied by an outer peripheral surface of the shaft itself or by an inner cylinder fixed to the outer peripheral surface of the shaft. If the shaft is cylindrical, the one forming member may be embodied by an outer or inner peripheral surface of the shaft or an inner or outer cylinder attached to the outer or inner surface of the shaft.

If the one forming member is embodied by the outer peripheral surface of the shaft itself, the other forming member may be formed of a cylinder attached to the outer peripheral surface of the shaft, wherein the accommodating chamber is formed between the outer peripheral surface of the shaft and the inner peripheral surface of the cylinder and the first coil spring is provided on the outer peripheral surface of the cylinder. If the one forming member is embodied by the outer or inner peripheral surface of the shaft itself, the other forming member may be formed of a cylinder attached to the outer or inner peripheral surface of the shaft, wherein the accommodating chamber is formed between the outer peripheral surface of the shaft and the inner peripheral surface of the cylinder or between the inner peripheral surface of the shaft and the outer peripheral surface of the cylinder and the first coil spring is provided on the outer or inner peripheral surface of the cylinder.

If the one forming member is embodied by an inner cylinder attached to the outer peripheral surface of the shaft, the other forming member may be embodied by the outer cylinder attached to the outer peripheral surface of the inner cylinder, wherein the accommodating chamber is formed between the outer peripheral surface of the inner cylinder and the inner peripheral surface of the outer cylinder and the first coil spring is provided around the outer peripheral surface of the outer cylinder. If the one forming member is embodied by an outer cylinder attached to the inner peripheral surface of the shaft, the other forming member may be embodied by an inner cylinder attached to the inner peripheral surface of the outer cylinder, wherein the viscous fluid accommodating chamber is formed between the inner peripheral surface of the outer cylinder and the outer peripheral surface of the inner cylinder and the first coil spring is provided around the inner peripheral surface of the inner cylinder.

In one example, the brake pedal comprises a cylinder concentric to the shaft of the frame, wherein a second coil spring is wound around the inner or outer peripheral surface of the cylinder. In another example, the brake pedal comprises a column concentric to the shaft of the frame, wherein the second coil spring is wound around the outer peripheral surface of the column.

In the present invention, the release means comprises a release lever attached rotatably to the frame such that the lever is engaged at one end thereof with an other end of the second coil spring on turning thereof to thereby expand or reduce a diameter of the second coil spring and hence release the contact of the second coil spring with the brake pedal with high frictional resistance, and a urging spring for urging the release lever by a resiliency thereof to release an engagement of the end of the release lever with the other end of the second coil spring. The other end of the release lever is preferably formed such that it is capable of connecting to a release cable for turning the release lever against the resiliency of the spring.

In the present invention, spacing maintaining means may be provided between a free end of the cylinder of the brake pedal and the other forming member to maintain a spacing between the free end of the cylinder of the brake pedal and the other forming member.

One preferable example of the spacing maintaining means is a protrusion formed integrally on the other forming member from a standpoint of ease of working and assembling. Alternatively, such a protrusion may be fixed by welding or the like to the free end of the cylinder of the brake pedal.

In the one-way damper of the present invention, the diameter of the coil spring is, for example, increased on one-direction rotation of the coil spring relative to the other forming member. By such an increase in the diameter of the coil spring, and if the coil spring is disposed so as to be wound looser around the other forming member, the coil spring slides uselessly or runs idle relative to the other forming member. As a result, the rotation of the coil spring is not transmitted to the other forming member, so that no relative rotation occurs between both the forming members and, for example, no viscous shearing force occurs in the viscous fluid accommodated in the accommodating chamber. Thus the coil spring is rotated relative to the other forming member without resistance. When the diameter of the coil spring is reduced on the rotation of the coil spring relative to the other forming member in a direction reverse to the one direction, the coil spring is tighter wound around the other forming member. Thus the coil spring and the other forming member are rotated in the same direction so that the rotation of the coil spring is transmitted to the other forming member and hence a relative rotation occur between both the forming members to thereby produce a viscous shearing force in the accommodated in the accommodating chamber. At this time, the coil spring is rotated slowly due to viscous shearing resistance deriving from the viscous fluid.

Since such one-way damper can be provided on a pivot of the pedal arm, it does not occupy so large a space in a car and provides enough space around the brake pedal. In addition, By a simple structure, enough low resistance is exhibited on the stepping-down of the brake pedal and a desired damping force is produced on the pedal return to thereby avoid a possible occurrence of foreign noise due to severe collision with a stopper or the like.

In another foot-operated parking brake for a car according to the present invention, the diameters of the first and second coil springs are, for example, increased on a rotation of the first coil spring relative to the other forming member and on a turning of the pedal arm relative to the second coil spring, respectively, due to the stepping-down of the brake pedal. By such an increase in the diameters of the coil springs, the first coil spring slides uselessly or runs idle relative to the other forming member. As a result, the rotation of the first coil spring is not transmitted to the other forming member, so that no relative rotation occurs between both the forming members and, for example, no viscous shearing force occurs in the viscous fluid accommodated in the accommodating chamber. Little sliding frictional resistance due to the second coil spring occurs on the pedal arm, so that the pedal arm is rotated without resistance. If the stepping-down force to the brake pedal is released, the pedal arm tends to rotate to return to its home position due to the return spring. At this time, the diameter of the second coil spring is, for example, reduced to prevent the returning rotation of the pedal arm and hence lock the pedal arm to thereby keep the same at its rotational position. If this locking is released by the release means, the pedal arm is rotated due to the resiliency of the return spring in a direction reverse to the direction in which the pedal arm has been rotated previously to thereby, for example, reduce the diameter of the first coil spring. This causes the first coil spring to be tighter wound around the other forming member, so that the first coil spring and the other forming member rotate in the same direction and hence the relative rotation of the first coil spring is transmitted to the other forming chamber. This causes a relative rotation between both the forming members to thereby cause a viscous shearing force in the viscous fluid accommodated in the accommodating chamber. At this time, the pedal arm connected to the first coil spring is slowly rotated due to the viscous shearing resistance in the viscous fluid.

Accordingly, such foot-operated parking brake for a car provides enough space around the brake pedal. In addition, by a simple structure, enough low resistance is exhibited on the stepping-down of the brake pedal and a desired damping force is produced on the pedal return to thereby avoid a possible occurrence of foreign noise due to severe collision with a stopper or the like and due to meshing of the ratchet teeth and hence a very quiet operation of the parking brake is performed.

In the foot-operated parking brake with the spacing maintaining means for a car according to the present invention, even if a force in an inclined direction transverse to the stepping-down direction is applied to the pedal arm, the spacing maintaining means prevents a possible large displacement of the free end of the cylinder, excessive contact of the inner peripheral surface of the cylinder with the coil spring during the rotation and hence occurrence of foreign noise and/or resistance to the stepping-down of the pedal. Since the spacing maintaining means prevents the axial movement of the coil spring, slippage of the coil spring away off the forming member is also prevented.

The present invention will be described with respect to a preferred embodiment thereof shown in the accompanying drawings. Thus the above and other inventions will be further clarified. It is to be noted that the present invention is not limited to the embodiment.

BRIEF DESCRIPTION OF THE INVENTION

DETAILED DESCRIPTION

Figure 1:
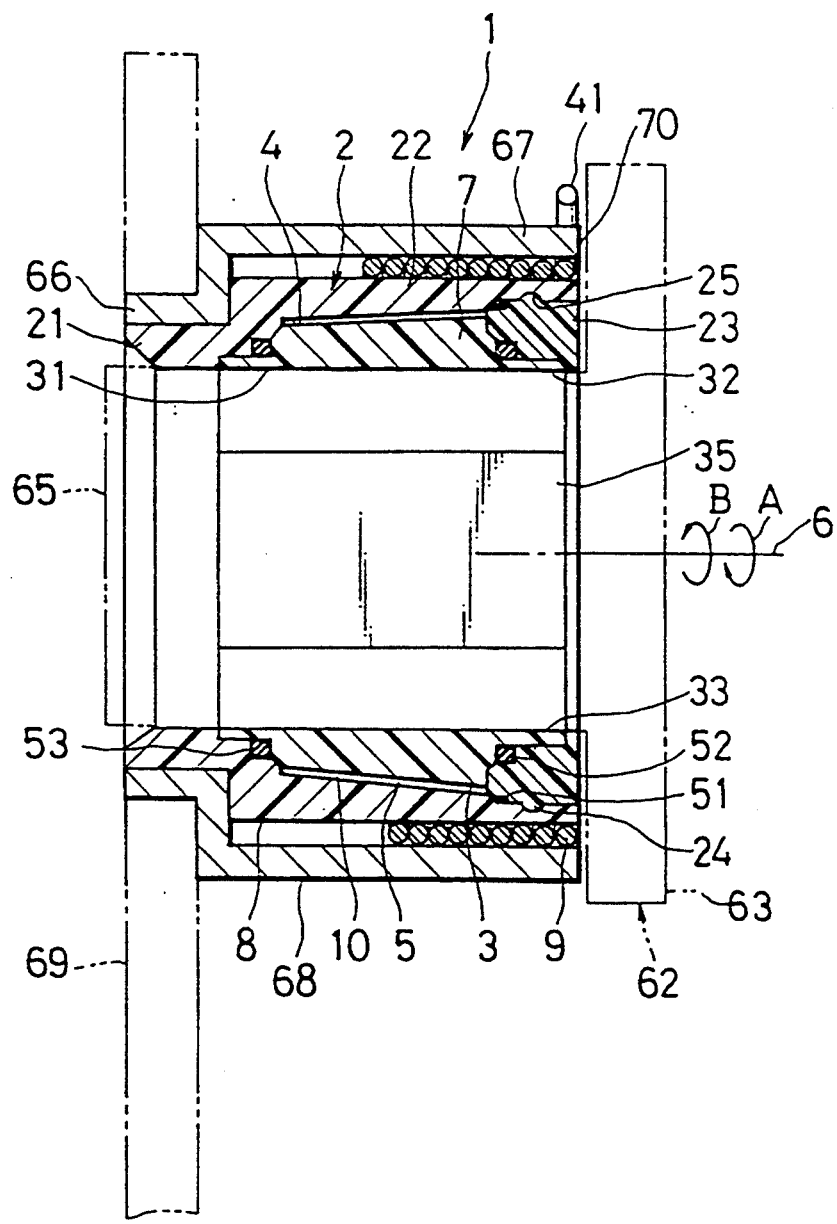
FIG. 1 is a cross-sectional view of a preferred one-way damper according to the present invention taken generally about on line 1—1 in FIG. 2.
Figure 2:
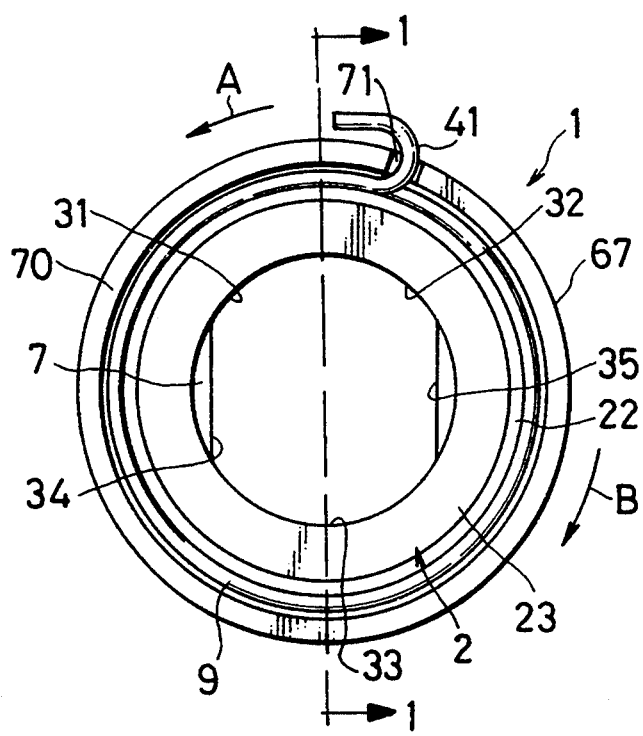
FIG. 2 is a side view of the embodiment of FIG. 1.

In FIGS. 1 and 2, the one-way damper 1 of the present embodiment is provided with an inner hollow cylinder 7 as one forming member and an outer hollow cylinder 2 as the other forming member attached concentric to the outer peripheral surface 3 of the inner cylinder 7, the outer cylinder 2 being rotatable relative to the inner cylinder 7 around the axis 6 in opposite directions A and B, the outer cylinder 2 and the inner cylinder 7 forming a cylindrical accommodating chamber 5 between their inner and outer peripheral surfaces 4 and 3, respectively, a first coil spring 9 wound around the outer peripheral surface 8 of the outer cylinder 2 and a viscous fluid 10 such as silicone filled in the chamber 5.

The outer cylinder 2 made of a synthetic resin such as polyacetal is provided with a smaller diameter portion 21, a larger diameter portion 22 integral with the smaller diameter portion and an annular lid 23 fitted between the larger diameter portion 22 and the inner cylinder 7 such that annular protrusion 24 formed on the outer peripheral surface of the lid 23 fits an annular groove 25 formed in the outer peripheral surface of the larger diameter portion 22.

The inner peripheral surface 31 of the inner cylinder 7 made of a synthetic resin such as polyacetal is provided with opposite arcuate surfaces 32, 33 and opposite flat surfaces 34, 35.

The coil spring 9 has a U-like end 41 and the other end (not shown) as a free end on the outer peripheral surface 8 of the outer cylinder 2. The coil spring 9 has an inner diameter substantially equal to the outer diameter of the larger diameter portion 22 at the position where the coil spring 9 is wound around the outer peripheral surface 8. Thus in a normal state where the diameter of the coil spring 9 is neither expanded nor reduced, that portion of the coil spring 9 wound around the outer peripheral surface 8 of the coil spring 9 contacts the outer peripheral surface 8 so loosely that predetermined frictional resistance is obtained.

Seal rings 51, 52 and 53 are provided between each of the larger diameter portion 22 and inner cylinder 7 and the annular lid 23 and between the larger diameter portion 22 and the inner cylinder 7 in order to hold the accommodating chamber 5 in a hermetically sealed state.

Figure 3:
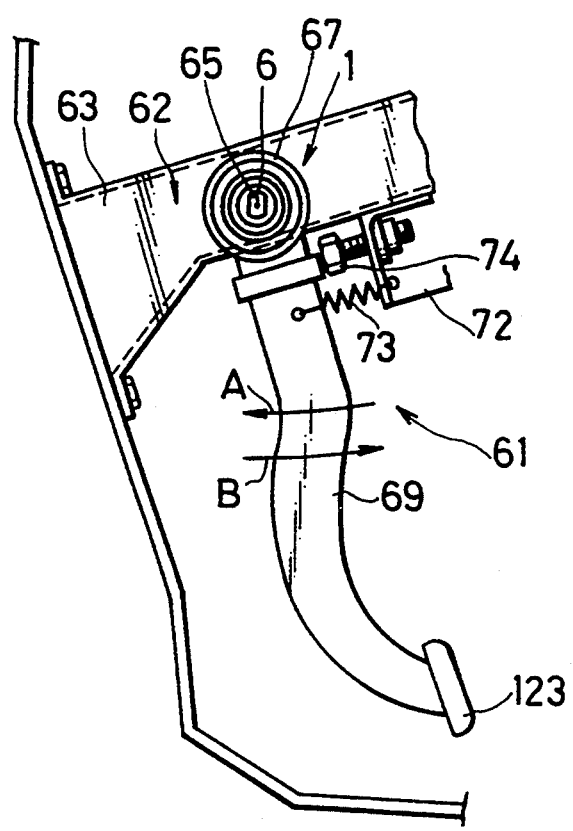
FIG. 3 illustrates a parking brake to which the FIG. 1 embodiment is applied.

The one-way damper 1 thus constructed is applied to a parking brake 61, as shown in FIG. 3. A bracket 62 as a frame attached to the car body is provided with a body 63 and a shaft 65 integral with the body 63. The inner cylinder 7 fits at its inner peripheral surface 31 over the shaft 65 such that the one-way damper 1 is attached to the bracket 62. The outer shape of the shaft 65 corresponds to the shape of the inner peripheral surface 31 of the inner cylinder 7 such that the inner cylinder 7 is fixed to the shaft 65 so as not to rotate in the directions A and B. A brake pedal 61 is provided with a pedal arm 69, a pedal 123 attached to one end of the pedal arm 69, and a hollow cylinder 67 fixed to the pedal arm 69 which in turn is provided with a smaller diameter portion 66 fitted into the pedal arm 69 and a larger diameter portion 68 integral with the smaller diameter portion 66. The cylinder 67 is disposed concentrically over the outer cylinder 2 so as to be rotatable relative to the outer cylinder 2 in the directions A and B. One annular end face 70 of the larger diameter portion 68 of the cylinder 67 is provided with a slit 71 through which the U-like end 41 of the coil spring 9 extends to be hooked on the cylinder 67. The outer cylinder 2 is disposed so as to be rotatable relative to the shaft 65, inner cylinder 7 and cylinder 67 in the directions A and B. A return spring 73 is stretched between the pedal arm 69 and a bracket 72 attached to the bracket 62 so as to return the pedal arm 69 to its home position under the resiliency of the spring 73. The bracket 72 is provided with a stop 74 which prevents unnecessary excessive turning of the pedal arm 69 around the axis 6 in the B direction.

This one-way damper type foot-operated parking brake operates as follows. When the pedal 123 is stepped down and the pedal arm 69 is rotated in the direction A against the resiliency of the return spring 73, the cylinder 67 connected to the pedal arm 69 is also rotated in the direction A. Thus the coil spring 9 connected at one end 41 to the cylinder 67 and contacting the outer peripheral surface 8 of the outer cylinder 2 is also rotated in the direction A in such a manner that it is dragged on the outer peripheral surface 8 of the outer cylinder 2. In this dragging, since the coil spring 9 receives from the outer peripheral surface 8 of the outer cylinder 2 such a sliding resistance by which the diameter of the coil spring 9 is expanded, the coil spring whose diameter has been expanded slips rotationally relative to the outer cylinder 2 with reduced resistance and the outer cylinder 2 remains stationary without rotating along with the coil spring 9. When the coil spring 9 slides relative to the outer cylinder 2, the pedal arm 69 is turned in the direction A only by a force resisting the resiliency of the return spring 73. When a ratchet mechanism (not shown) is disengaged to release the brake, the pedal arm 69 urged by the return spring 73 begins to rotate in the direction B. This causes the cylinder 67 to also rotate in the direction B, so that the coil spring 9 connected at its end 41 to the cylinder 67 and contacting the outer peripheral surface 8 of the outer cylinder 2 is also rotated in a manner that it is dragged on the outer peripheral surface 8 of the outer cylinder 2. Since the coil spring 9 receives a sliding resistance such as reduces the diameter of the coil spring 9 from the outer peripheral surface 8 of the outer cylinder 2, the coil spring 9 whose diameter has been reduced is tighter wound around the outer peripheral surface 8, the sliding frictional resistance between the coil spring 9 and the outer peripheral surface 8 of the outer cylinder 2 increases and hence the outer cylinder 2 starts to rotate in the direction B along with the coil spring 9. This causes a viscous shearing force to be exerted on the viscous fluid 10 in the accommodating chamber 5, so that the outer cylinder 2 is rotated slowly by the viscous shearing resistance of the viscous fluid 10. As a result, the pedal arm 69 is also turned in the direction B to thereby avoid possible occurrence of foreign noise due to the pedal arm 69 otherwise crashing against the stop 74.

As described above, in the present parking brake using the one-way damper 1, the brake pedal 61 is biased by the return spring 73 such that the brake pedal 61 is returned to its home position by the resiliency of the return spring 73, the coil spring 9 is connected at the end 41 to any one of the brake pedal 61 and the bracket 62, in the present embodiment, to the brake pedal 61, and the inner cylinder 7 is connected to any one of the brake pedal 61 and the bracket 62, in the present embodiment, to the bracket 62. In the stepping-down stroke of the brake 61, or in the turning of the pedal arm 69 around the axis 6 is the direction A, the coil spring 9 slips rotationally relative to the outer cylinder 2. The direction of winding of the spring 9 is set such that in the stroke of the brake pedal returning to its home position, or in the turning of the pedal arm 69 around the axis 6 in the direction A, the coil spring 9 slips rotationally relative to the outer cylinder 2, while in the stroke of the brake pedal to its home position or in the turning of the pedal arm 69 around the axis 6 in the direction B, the coil spring 9 contacts the outer spring 9 with high frictional resistance.

Since the one-way damper 1 is provided compactly on the shaft of the pedal arm 69, the space around the pedal arm 69 is wide.

Figure 4:
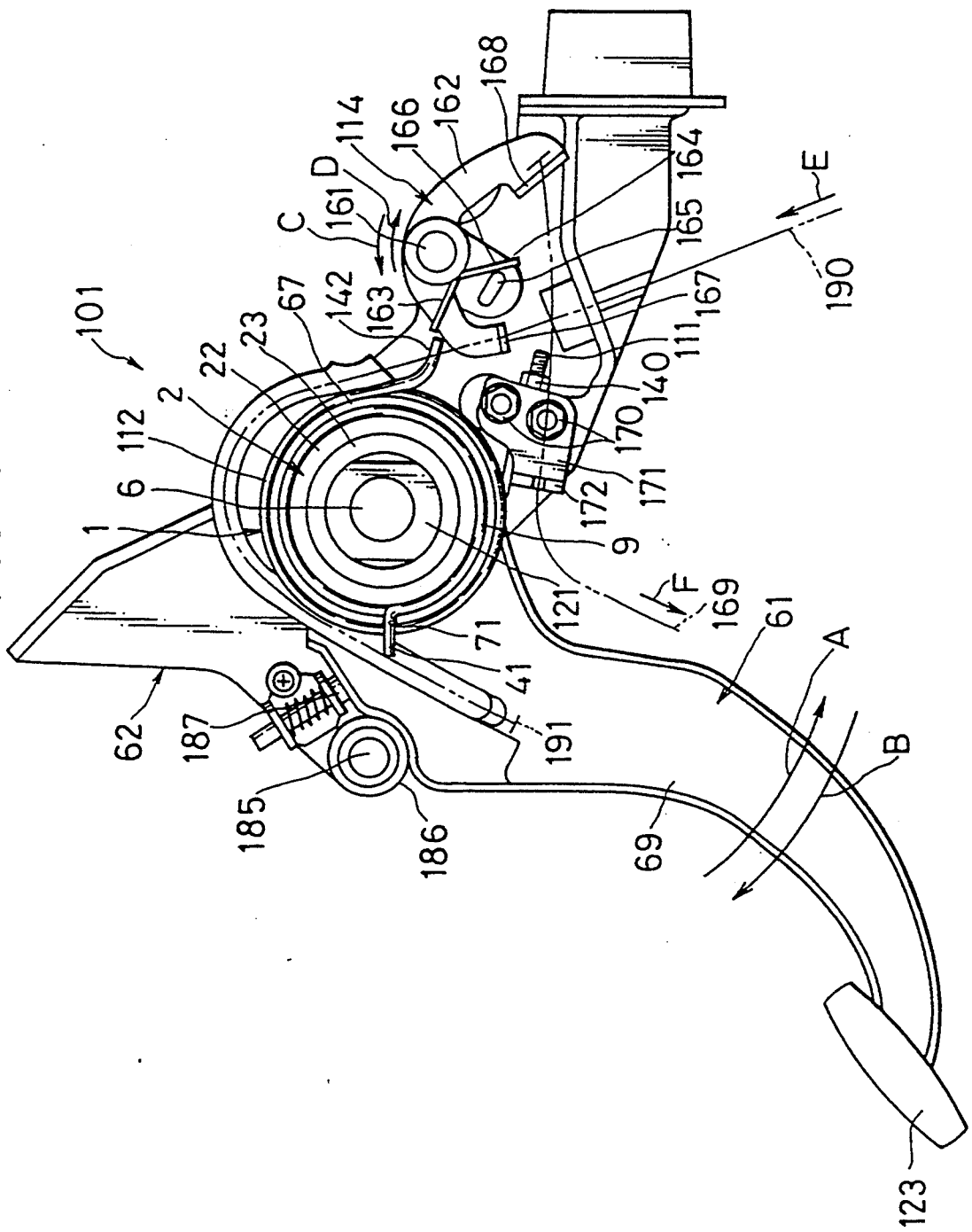
FIG. 4 is a side view of another preferred embodiment of the present invention.
Figure 5:
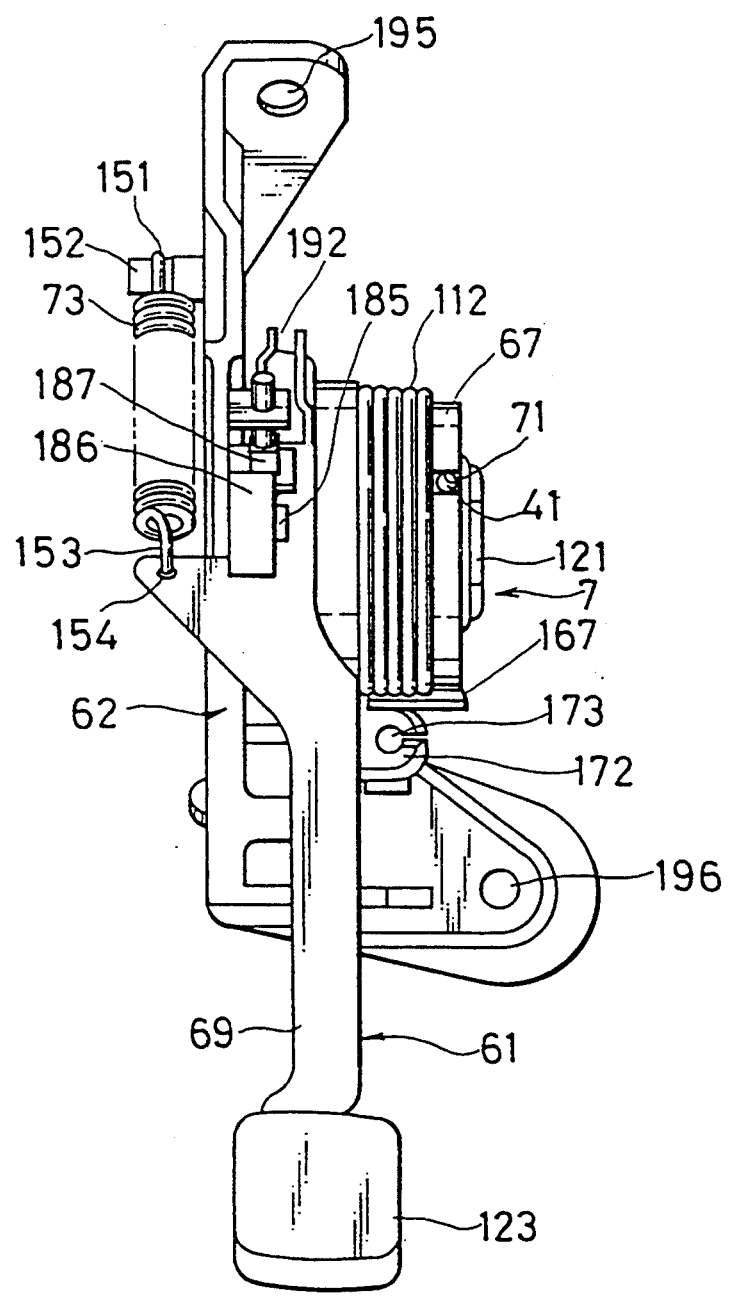
FIG. 5 is a front view of the FIG. 4 embodiment.
Figure 6:
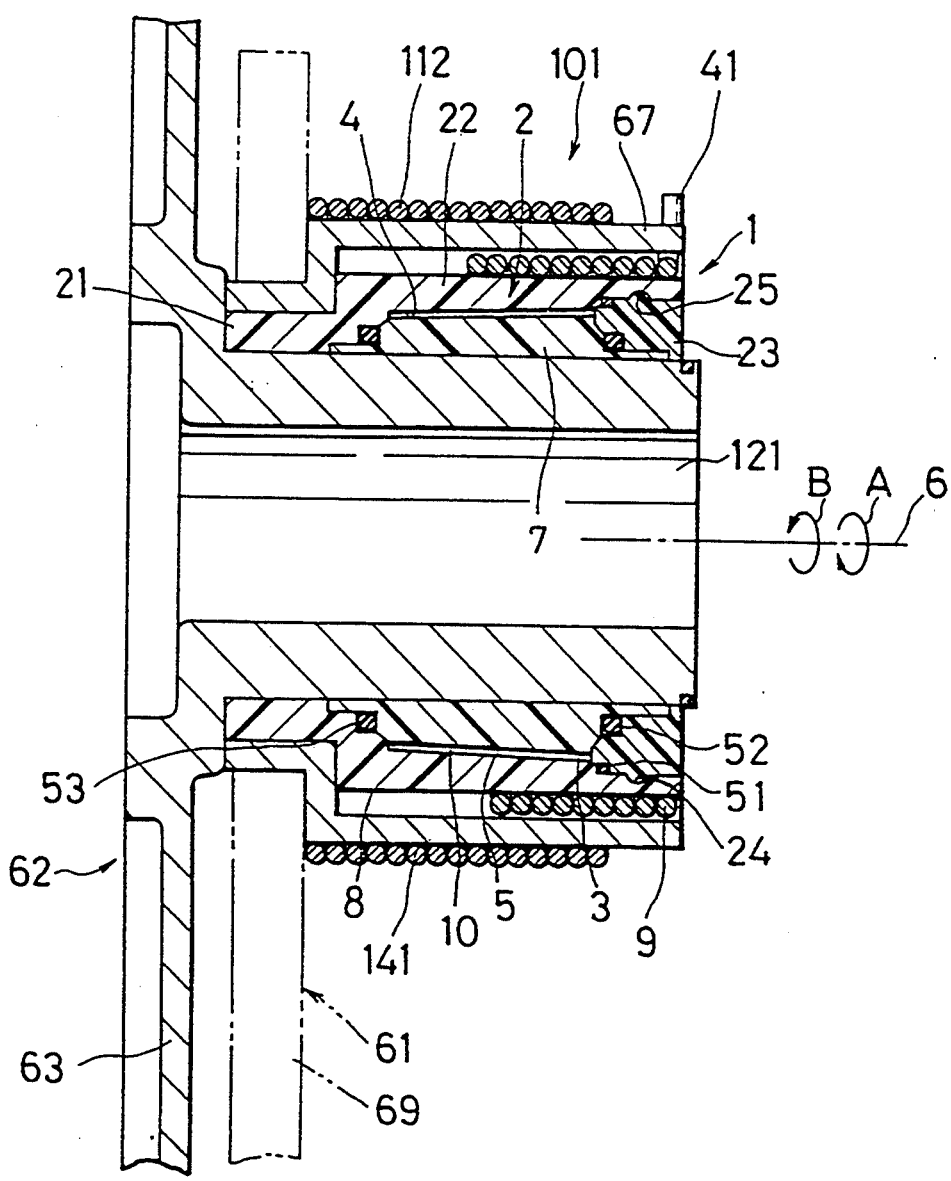
FIG. 6 is a partial cross-sectional view of the FIG. 4 embodiment.

Another embodiment of the present invention will be next described with respect to FIGS. 4 to 6, where in addition to the one-way damper 1 the foot-operated parking brake 101 for a car is provided with a second coil spring 112 wound around the cylinder 67, and a release unit 114. More specifically, the parking brake 101 is provided with a frame 62, a brake pedal 61 attached rotatably to the frame 62, an inner cylinder 7 as one forming member provided fixedly to the frame 62, an outer cylinder 2 as the other forming member disposed concentric to the inner cylinder 7 such that the inner and outer cylinders 7 and 2 forms a viscous fluid accommodating chamber 5 therebetween and such that the outer cylinder 2 is rotatable relative to the inner cylinder 7 around the axis 6 in the directions A and B, a viscous fluid 10 such as silicone contained in the accommodating chamber 5, a first coil spring 9 connected at one end 41 to the brake pedal 61, the first coil spring having its direction of winding and disposed on the outer cylinder 2 such that the first coil spring 9 slides relative to the outer cylinder 2 in the stroke of the brake 61 being stepped down or rotated in the direction A around the axis 6 and that the first coil spring 9 contacts the outer cylinder 2 with high frictional resistance in the stroke of the brake pedal 61 returning to its home position or rotated around the axis 6 in the direction B, a second coil spring 111 connected at one end 111 to the frame 62, the second coil spring having its direction of winding such that the second coil spring 111 loosely contacts the brake pedal 61 in the stroke of the brake 61 being stepped down and that the second coil spring 111 contacts the brake pedal 61 with high frictional resistance in the stroke of the brake pedal 61 returning to its home position, a return spring 73 stretched between the frame 62 and the brake pedal 61, such that the brake pedal 61 is returned to its home position by the resiliency of the return spring and a release unit 114 for releasing the engagement of the coil spring 112 with the brake pedal 61 with high frictional resistance.

The frame 62 of the present embodiment has a cylindrical shaft 121 to which the inner cylinder 7 is fixed with the frame body 63 being disposed close to the pedal arm 69.

The coil spring 9 has an outward bent end 41 which extends outside through a slit or opening 71 in the cylinder 67 to be connected to the brake pedal 61.

The coil spring 112 has a threaded end 111 which is connected through a nut 140 or the like to the frame 62. The coil spring 112 is wound around the outer peripheral surface 141 of the cylinder 67 with the other end of the spring 112 being bent so as to extend outward. The coil spring 112 is formed such that its portion wound around wound the outer peripheral surface 141 of the cylinder 67 has an inner diameter substantially equal to the outer diameter of the cylinder 67. Thus in a normal state where the diameter of the coil spring 112 is neither expanded nor reduced, that portion of the coil spring 112 wound around the outer peripheral surface 141 of the cylinder 67 contacts the outer peripheral surface 141 so loosely that a predetermined frictional resistance is obtained.

A return spring 73 of a coil spring is stretched between the frame 62 and the brake pedal 61 such that the return spring 73 has one end 151 engaged with a protrusion 152 on the frame 62 and the other end 153 engaged in a hole 154 in the pedal arm 69 to thereby urge the pedal arm 69 so as to turn in the direction B due to the resiliency of the spring 73.

The release unit 114 is provided with a release lever 162 attached rotatably through a shaft 161 to the frame 62, an urging coil spring 166 having one end 163 engaged with the release lever 162 and the other end 164 engaged with the protrusion 165 on the frame 62 and wound around the shaft 161 so as to turn the release lever 162 around the shaft 161 in the direction C due to the resiliency of the spring 166. The release lever 162 has a bent end 167. When the release lever 162 is turned around the shaft 161 in the direction D against the resiliency of the coil spring 166, the release lever 162 abuts at its bent end 167 on the other end 142 of the coil spring 112, pushes same up to thereby expand the diameter of the coil spring 112 and hence release the contact of the coil spring 112 with the cylinder 67 with high frictional resistance. The coil spring 166 biases the release lever 162 by its resiliency so as to release the engagement of the end 167 of the release lever 162 with the other end 142 of the coil spring 112. The bent end 168 of the release lever 162 has a hole for connecting a release cable 169 for turning the release lever 162 in the direction D against the resiliency of the coil spring 166. The release cable 169 is drawn to a predetermined position through a hole 173 in a bent portion 172 of a guide 171 attached to the frame 62 means of, for example, bolt 170.

Attached to the frame 62 through a shaft 185 is a stop roller 186 which prevents unnecessary excessive rotation of the pedal arm 69 in the direction B to thereby hold the pedal arm 69 at its home position when the pedal arm 69 abuts on the stop roller 186. A sensor 187 is attached to the frame 62 to electrically sense the turning position of the pedal arm 69. A parking cable 190 is fixed at one end 191 thereof to the pedal arm 69, extends outside through a groove 192 on the outer edge of the pedal arm 69 and is connected to a braking mechanism of the car (not shown).

The foot-operated parking brake 101 is attached to a chassis by bolting through holes 195 and 196 in the frame 62. When the pedal 123 is stepped down and the pedal arm 69 is turned in the direction A against the resiliency of the return spring 73, the cylinder 67 is also rotated in the direction A, so that the coil spring 9 having one end 41 connected to the cylinder 67 and contacting the outer peripheral surface 8 of the outer cylinder 2 is rotated in the direction A in such a manner that it is dragged on the outer peripheral surface 8. Since the coil spring 8 receives from the outer peripheral surface 8 a resistance such as expands its diameter in the dragging operation, the expanded coil spring 8 slides relative to the outer cylinder 2 with reduced resistance while the outer cylinder 2 remains stationary without rotating with the coil spring 9.

The cylinder 67 tends to rotate in the direction A such that it drags the coil spring 112 having one end 111 connected to the frame 62 and contacting on the outer peripheral surface 141 of the cylinder 67. In this dragging operation, the coil spring 112 receives from the outer peripheral surface 141 a sliding resistance such as increases the diameter of the coil spring 112, so that the cylinder 67 rotates relative to the expanded coil spring 112 with reduced resistance.

When the coil spring 9 slides relative to the outer cylinder 2 and the cylinder 67 slides relative to the coil spring 112, the pedal arm 69 is rotated in the direction A only by a force resisting the resiliency of the return spring 73. By the turning of the pedal arm 69 in the direction A, the parking cable 190 is pulled in the direction E, so that the braking mechanism is operated. When the stepping-down force on the pedal 123 is released, the pedal arm 69 tends to be rotated in the direction B by the return spring 73. At this time, the coil spring 112 also tends to rotate in the direction B such that it is dragged on the outer peripheral surface 141 of the cylinder 67 at that time. In this dragging, the coil spring 112 receives from the outer peripheral surface 141 of the cylinder 67 a sliding resistance such as reduces the diameter of the coil spring 112, so that the reduced coil spring 112 is tighter wound around the outer peripheral surface 141 to thereby increase the sliding frictional resistance between the coil spring 112 and the outer peripheral surface 141 and hence prevents the rotation of the cylinder 67 in the direction B. This holds the pedal arm 69 at its stepped-down position to thereby maintain the pedal arm 69 in a braked state.

When the release cable 169 is pulled in the direction F to release the brake, the release lever 162 is turned in the direction D and its end 167 abuts on the other end 142 of the coil spring 112 to thereby expand the diameter of the coil spring 112. This causes the cylinder 67 to slidable rotationally relative to the coil spring 112 and the pedal arm 69 urged by the return spring 73 starts to turn in the direction B. This causes the cylinder 67 to rotate in the direction B whereby the coil spring 9 having one end 41 connected to the cylinder 67 and contacting the outer peripheral surface 8 of the outer cylinder 2 is dragged on the outer peripheral surface 8 of the outer cylinder 2 and rotated in the direction B. In this dragging operation, the coil spring 9 receives from the outer peripheral surface 8 a sliding resistance to reduce the diameter of the coil spring 8, so that the reduced coil spring 9 is wound tighter around the outer peripheral surface 8 and hence the sliding frictional resistance between the coil spring 9 and the outer peripheral surface 8 increases. Thus the outer cylinder 2 starts to rotate in the direction B with the coil spring 9. This causes a force for shearing the viscous fluid 10 in the accommodating chamber 105, so that the outer cylinder 2 rotates slowly due to the viscous shearing resistance of the viscous fluid 10. As a result, the pedal arm 69 starts to be turned slowly in the direction B to thereby avoid possible occurrence of foreign noise due to the pedal arm 69 otherwise crashing against the stop roller 186.

Since the parking brake 101 locks the pedal arm 69 with the coil spring 112 without using the ratchet tooth, so that no foreign noise is produced to thereby result in a very quiet parking brake operation. As described above, since the parking brake 101 is provided compactly around the shaft 121 of the brake pedal 61, a wide space is provided around the brake pedal 61.

Figure 7:
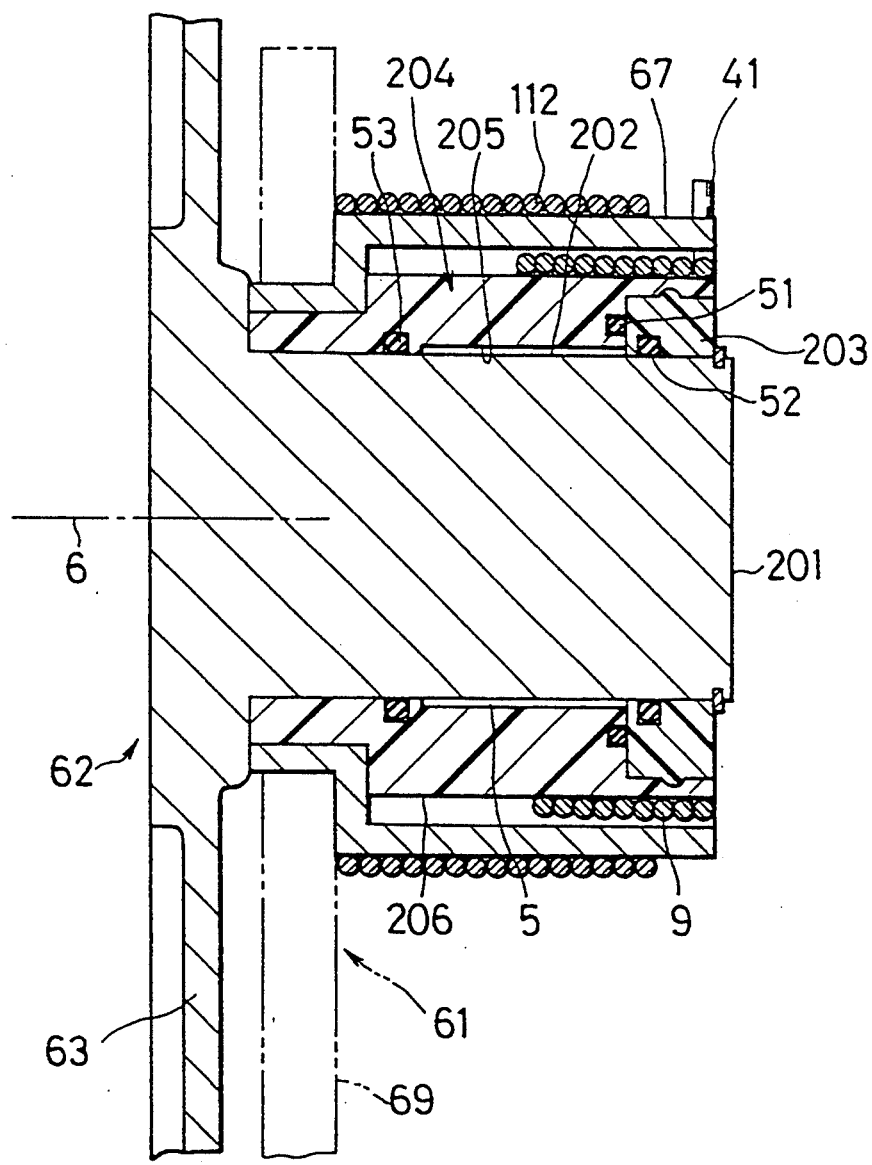
FIG. 7 is a partial cross-sectional view of a further preferred embodiment of the present invention.
Figure 8:
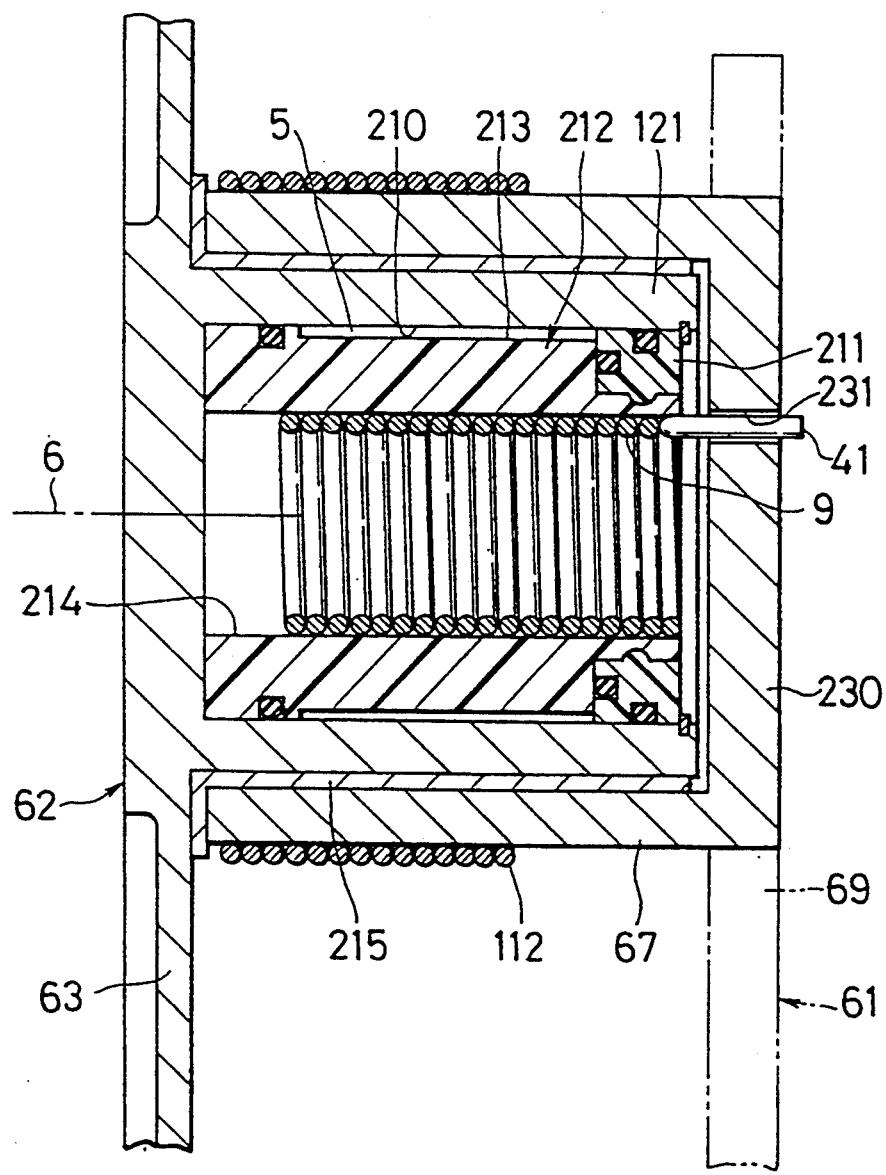
FIG. 8 is a partial cross-sectional view of a further preferred embodiment of the present invention.

While in the above embodiment the frame 62 has the cylindrical shaft 121, the one forming member includes the inner cylinder 7 attached fixedly to the outer peripheral surface of the shaft 121 and the other forming member includes the outer cylinder 2 attached to the outer peripheral surface of the inner cylinder 7, the inner and outer cylinders 7 and 2 form the accommodating chamber 5 between their outer and inner peripheral surfaces 3 and 4, respectively, and the coil spring 9 is wound around the outer peripheral surface 8 of the outer cylinder 2, the present invention is not restricted to this structure. For example, as in FIG. 7, arrangement may be such that a frame 62 comprises a solid shaft or column 201, one forming member is composed of the outer peripheral surface 202 of the shaft 201, a cylinder 204 with a lid 203 as the other forming member, similar to the outer cylinder 2 is disposed over the outer peripheral surface 202 of the shaft 201, the shaft 201 and the cylinder 204 form the accommodating chamber 5 between their outer and inner peripheral surfaces 202 and 205, respectively, and the coil spring 9 is wound around the outer peripheral surface 206 of the cylinder 204. Alternatively, as shown in FIG. 8, arrangement may be such that the one forming member is composed of the inner peripheral surface 210 of the cylindrical shaft 121, a cylinder 212 with a lid 211 as the other forming member, similar to the outer cylinder 2 is disposed inside the inner peripheral surface 210 of the shaft 121, the shaft 121 and the cylinder 211 form the accommodating chamber 5 between their inner and outer peripheral surfaces 210 and 213, respectively, a coil spring 9 is wound around the inner peripheral surface 214 of the cylinder 212, and a bearing bush 215 is disposed between the cylinder 67 of the brake pedal 61 and the shaft 121. In the embodiment of FIG. 8, the coil spring 9 is tighter wound around the inner peripheral surface 214 due to expansion of the diameter of the coil spring 9, so that the sliding frictional resistance increases between the coil spring 9 and the inner peripheral surface 214, the cylinder 212 is rotated on the rotation of the coil spring 9, and when the coil spring 9 is conversely reduced in diameter, it is more loosely wound around the inner peripheral surface 214, so that the coil spring 9 slides relative to the inner peripheral surface 214.

Figure 9:
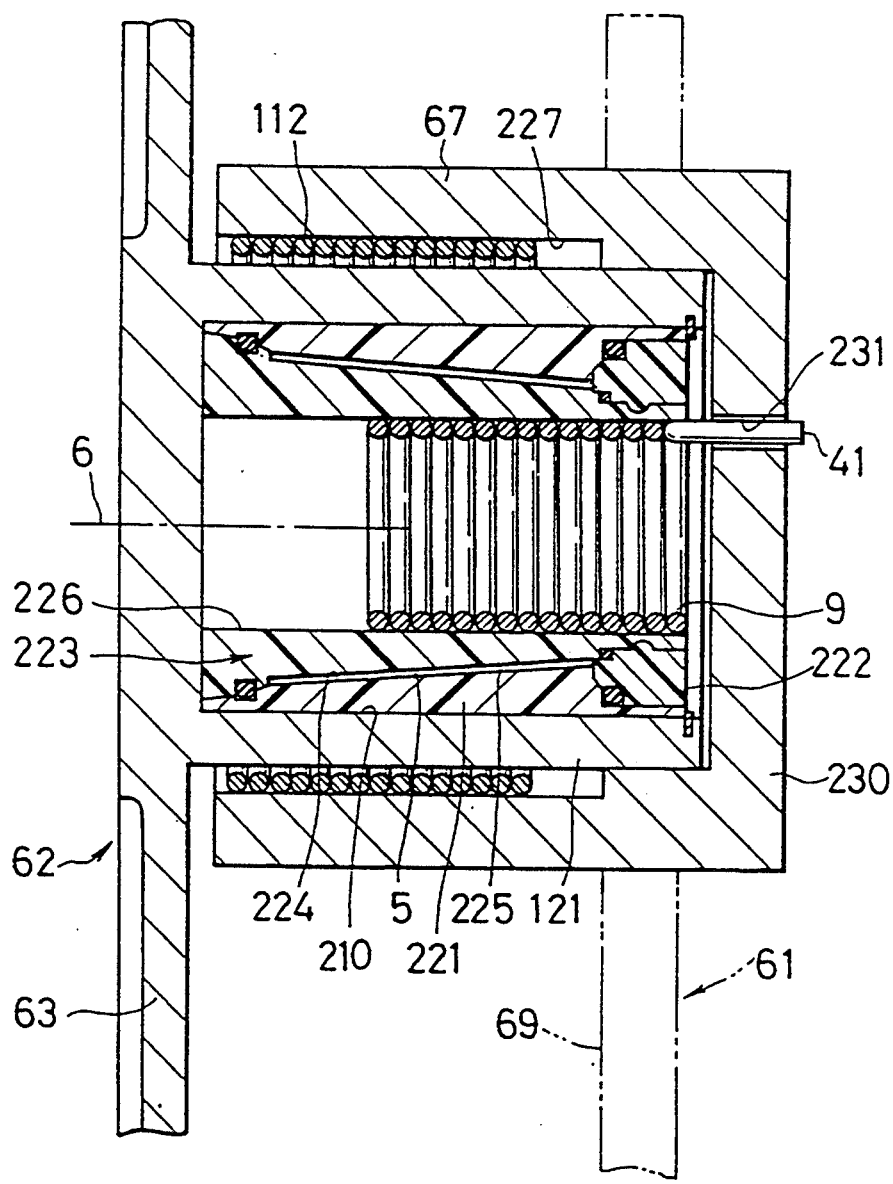
FIG. 9 is a partial cross-sectional view of a further preferred embodiment of the present invention.

As shown in FIG. 9, arrangement may be such that the outer cylinder 221 as the one forming member is disposed over the inner peripheral surface 210 of the cylindrical shaft 121 while the inner cylinder 223 with a lid 222 as the other forming member is disposed inside the inner peripheral surface 224 of the outer cylinder 221 such that the outer and inner cylinders 221 and 223 form the accommodating chamber 5 between their inner and outer surfaces 224 and 225, respectively, a coil spring 9 is wound around the inner peripheral surface 226 of the inner cylinder 223 and a coil spring 112 is wound around the inner peripheral surface 227 of the cylinder 67 of the brake pedal 61. In the present embodiment, the coil spring 9 acts as in the embodiment of FIG. 8. This causes the coil spring 112 to expand its diameter to thereby be wound tighter around the inner peripheral surface 227, and the sliding frictional resistance between the coil spring 112 and the inner peripheral surface 227 increases to thereby prevents the rotation of the cylinder 67. Thus, the pedal arm 69 is held at its stepped-down position or in a braking state. Conversely, when the coil spring 112 is reduced in diameter, the cylinder 67 is slidable relative to the coil spring 112. In the example of FIGS. 8 and 9, the sidewall 230 of the cylinder 67 has a hole 231 through which the coil spring 9 axially extends at one end 41 thereof to be connected to the brake pedal 61.

Figure 10:
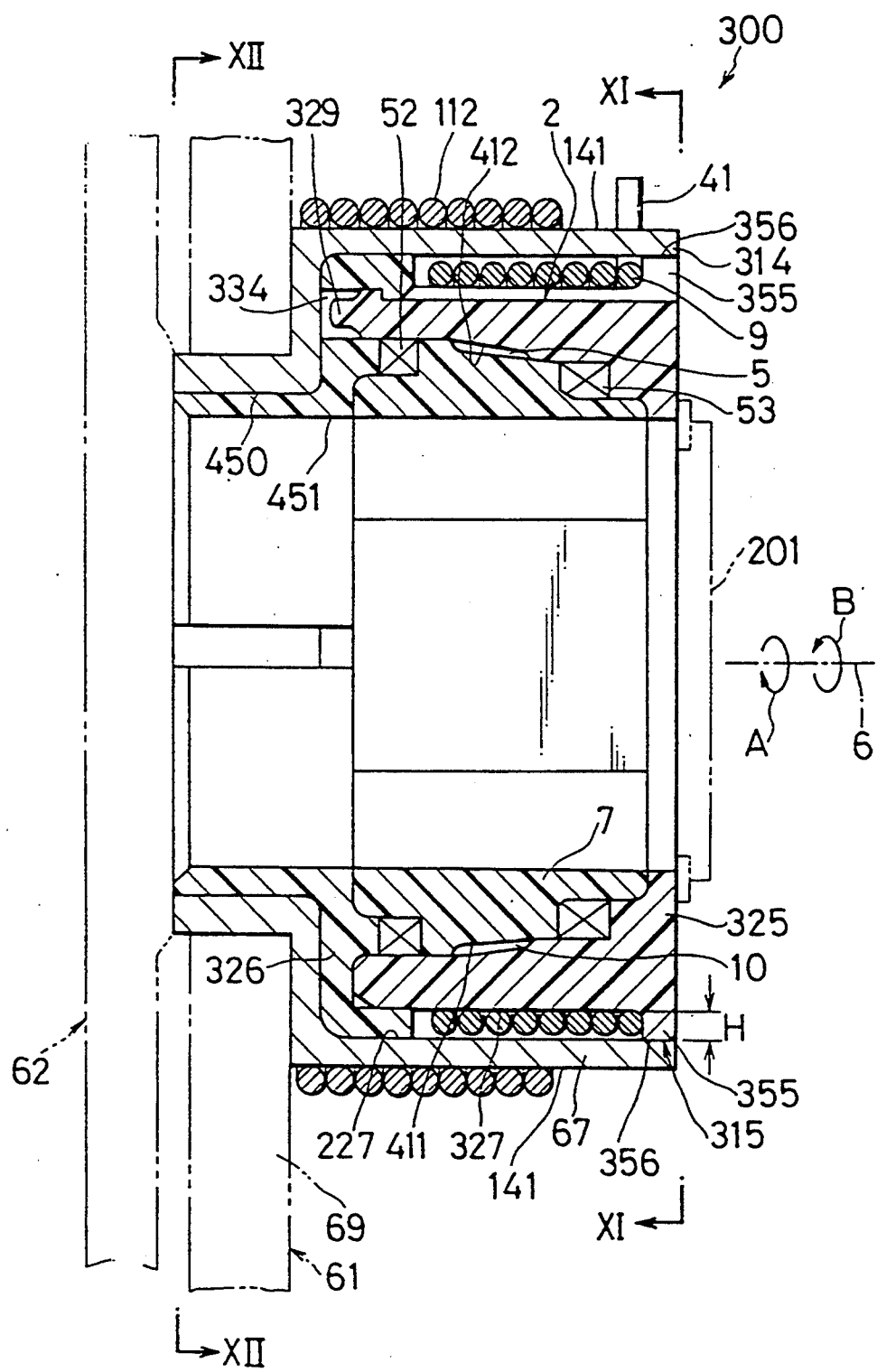
FIG. 10 is a cross-sectional view of a further preferred embodiment of the present invention, taken along the line X—X of FIG. 11.
Figure 11:
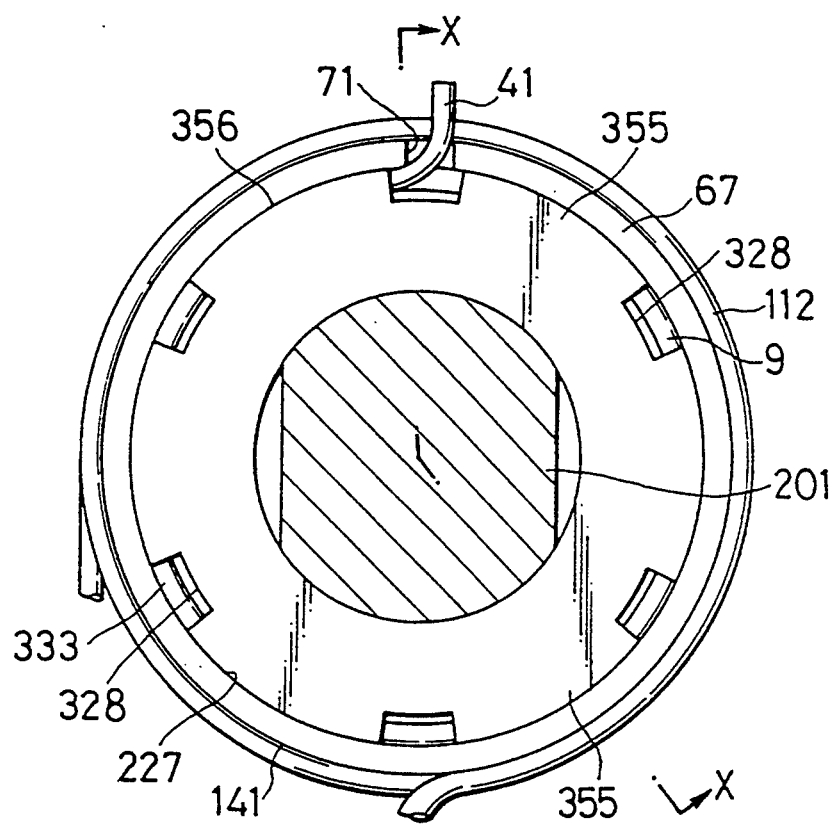
FIG. 11 is a view taken along the line XI—XI of FIG. 10.
Figure 12:
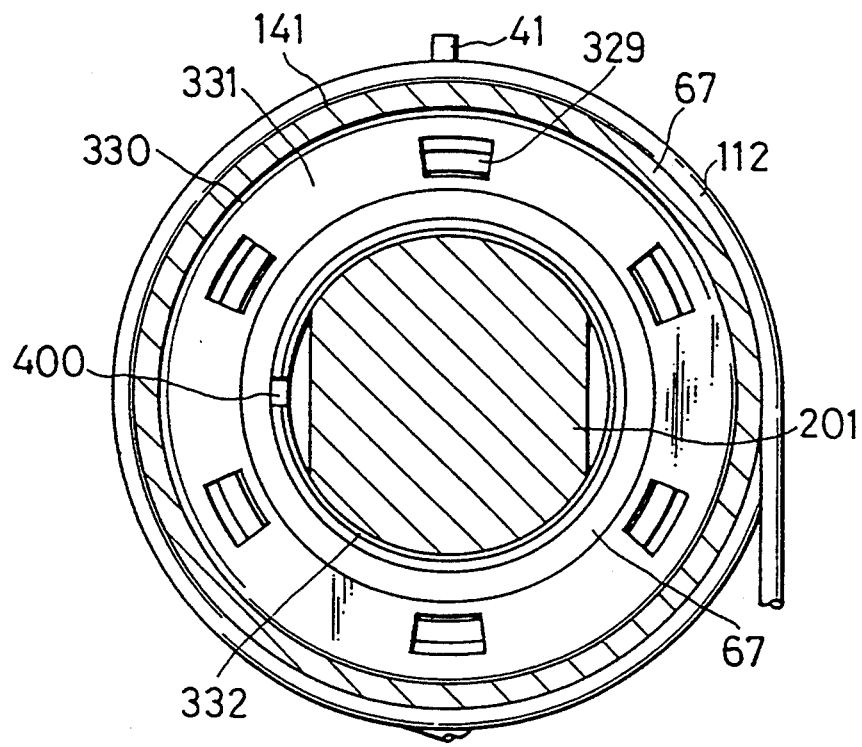
FIG. 12 is a view taken along the line XII—XII of FIG. 10.
Figure 13:
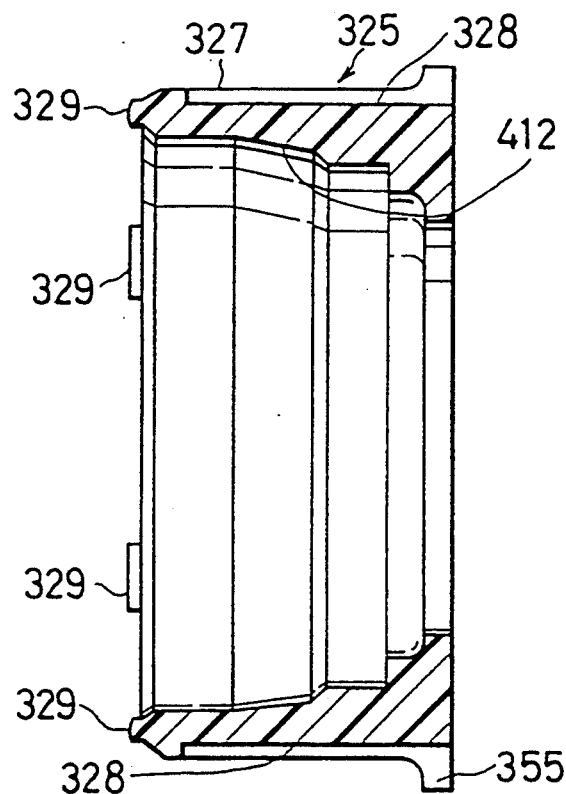
FIG. 13 is a cross-sectional view of the body of an accommodating chamber forming member of FIG. 10.
Figure 14:
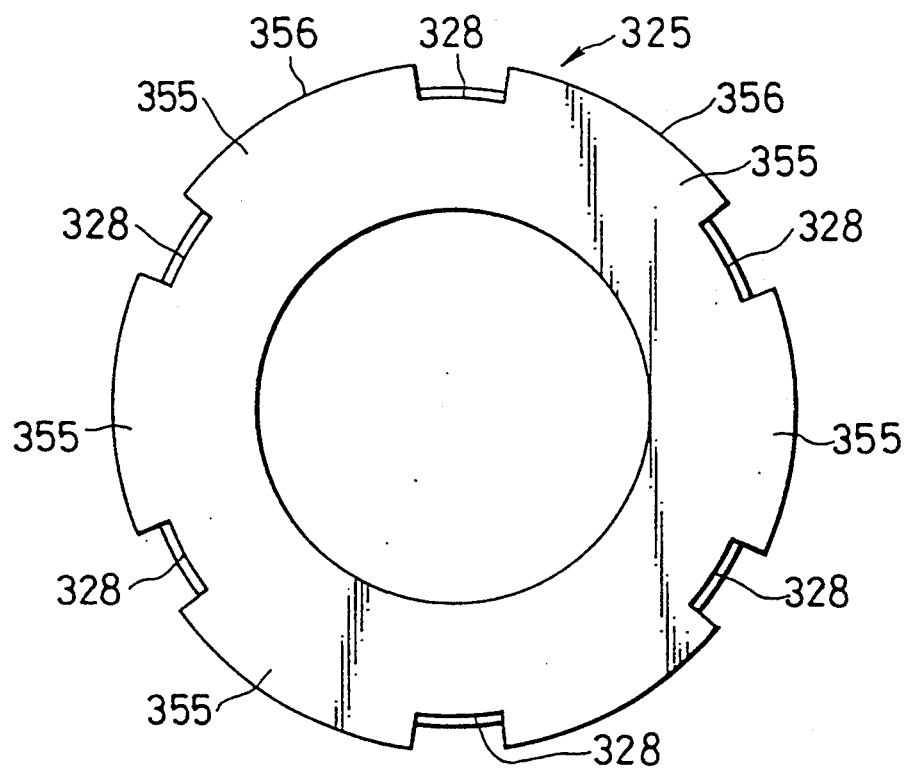
FIG. 14 is a right-hand side view of the body of the accommodating chamber forming member of FIG. 13.
Figure 15:
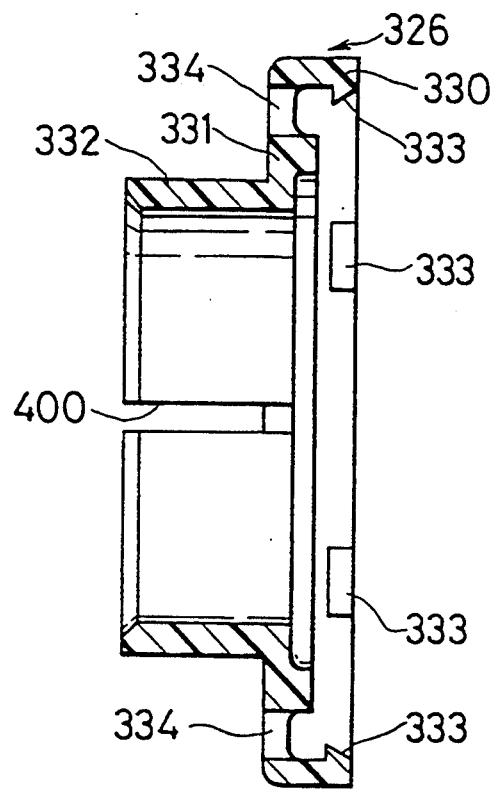
FIG. 15 is a cross-sectional view of a lid of the accommodating chamber forming member of FIG. 10.
Figure 16:
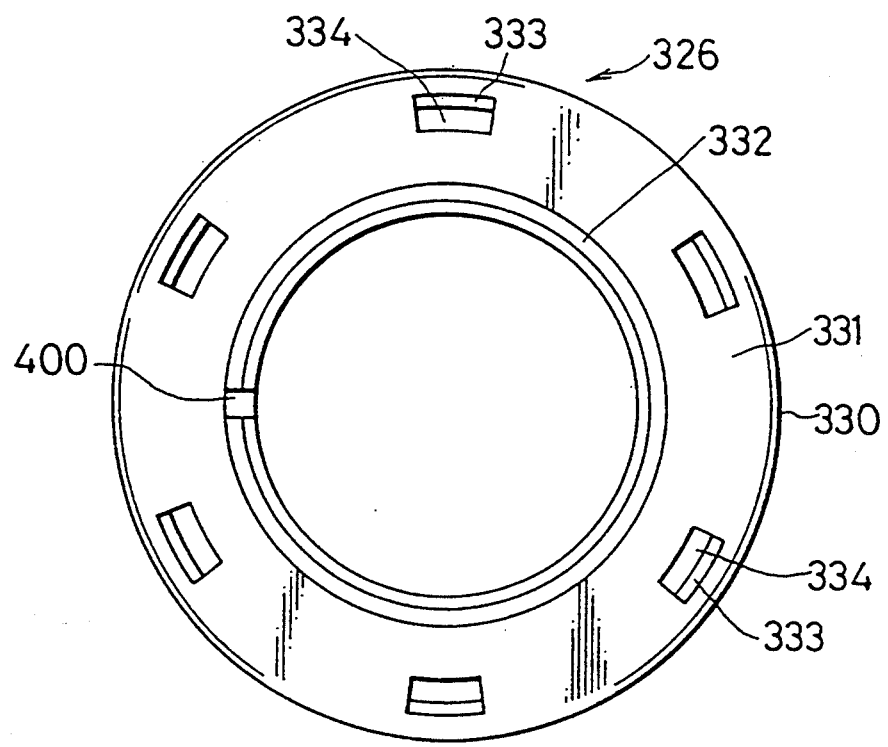
FIG. 16 is a left-hand side view of the lid of FIG. 10.
Figure 17:
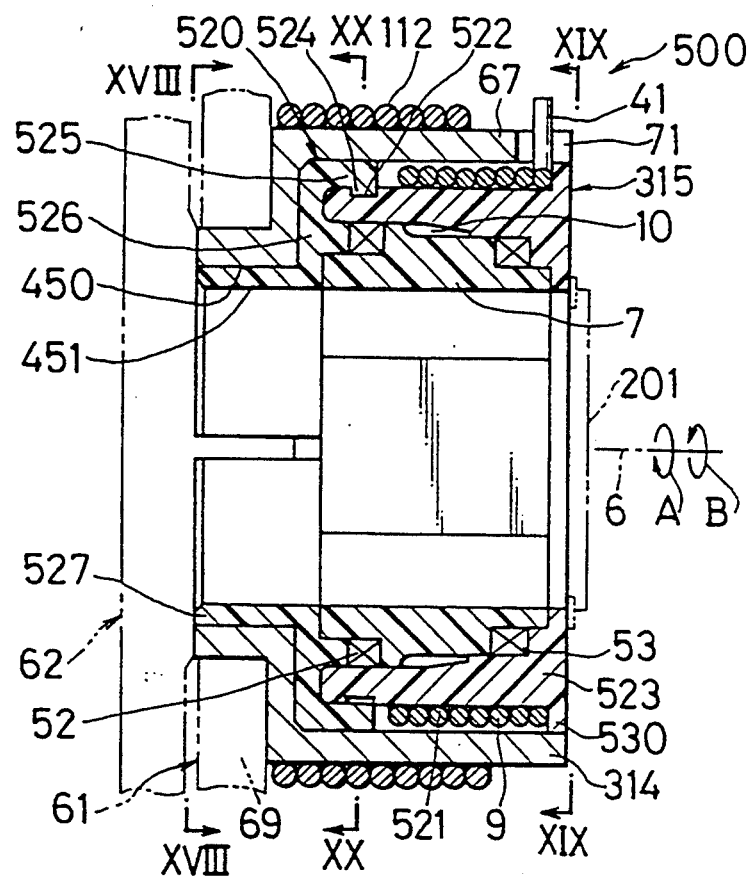
FIG. 17 is a cross-sectional view of a further preferred embodiment of the present invention taken along the line XVII—XVII of FIG. 18.
Figure 18:
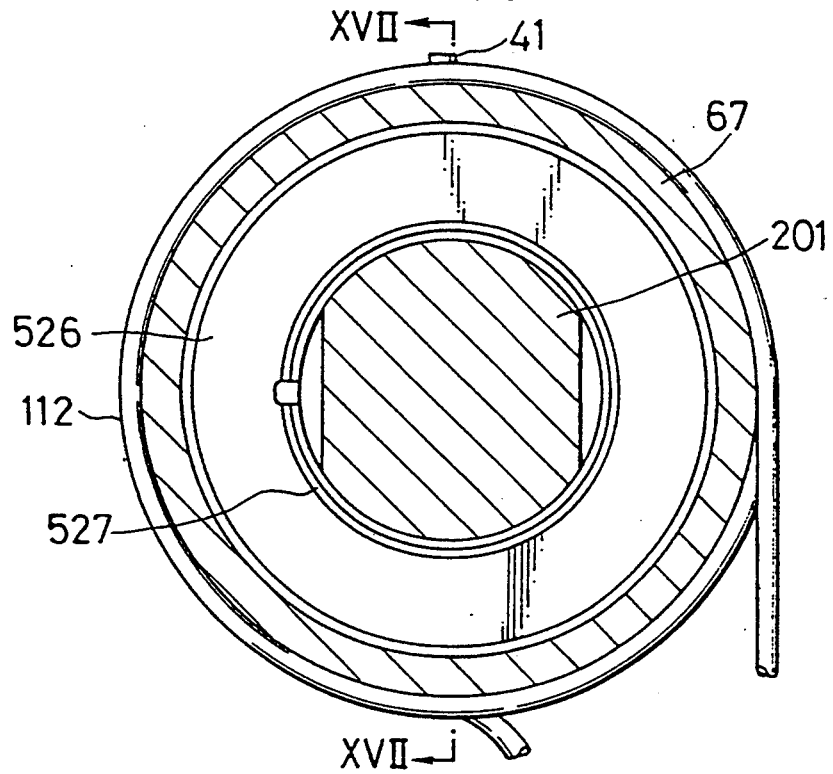
FIG. 18 is a view taken along the line XVIII—XVIII of FIG. 17.
Figure 19:
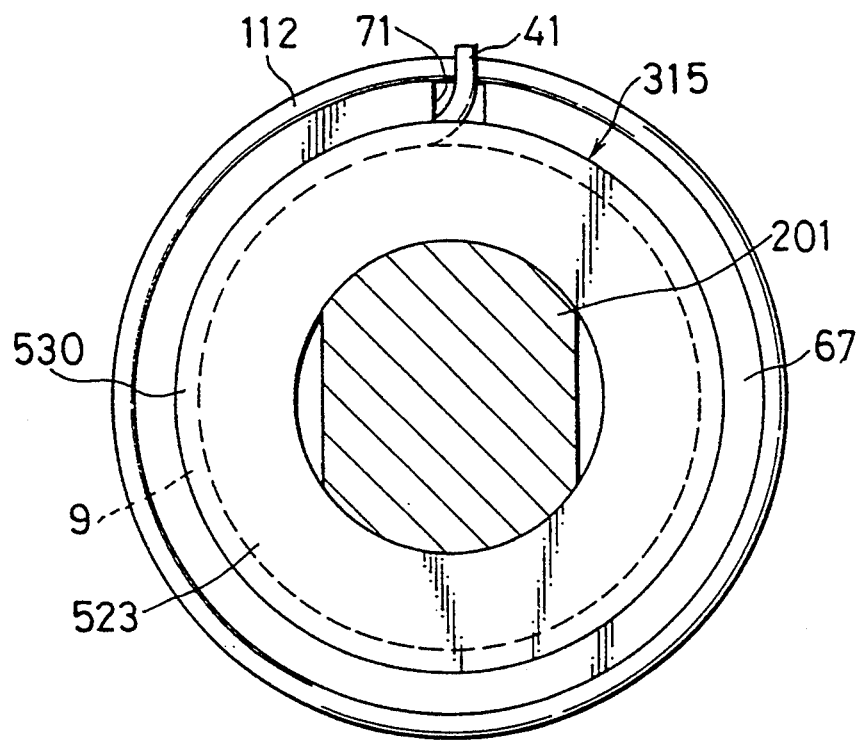
FIG. 19 is a view taken along the line XIX—XIX of FIG. 17.
Figure 20:
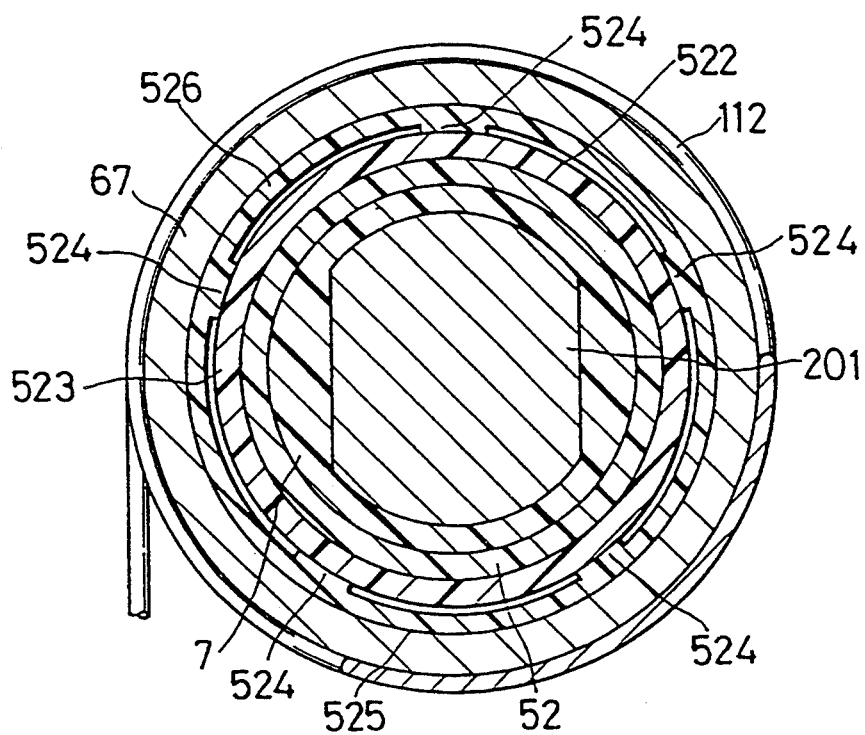
FIG. 20 is a cross-sectional view taken along the line XX—XX of FIG. 17.

Alternatively, as shown in FIGS. 10 to 12, a space maintaining member 315 which maintains a spacing H between a free end 314 of the cylinder 67 and the outer cylinder 2 may be disposed on the above-mentioned parking brake between the outer cylinder 2 and an annular free end 314 of the cylinder 67 to constitute a parking brake 300.

As shown in FIGS. 13 to 16, in the parking brake 300 of this embodiment, the outer cylinder 2 as the other forming member is provided with a cylindrical body 325 made of polyacetal and a cylindrical lid 326 made of polyacetal. The body 325 is provided with a plurality of axially extending concavities 328 on the outer peripheral surface 327 thereof around which the coil spring 9 is wound and a plurality of axially extending protrusions 329 on its one end surface thereof. The lid 326 is provided with a larger cylindrical diameter portion 330, and a smaller diameter portion 332 connected through an annular connecting portion 331 to the larger diameter portion 330. The larger diameter portion 330 has a plurality of pawls 333 corresponding to concavities 328, the connecting portion 331 has a plurality of through holes 334 corresponding to the protrusions 329, and the smaller diameter portion 332 has a slit 400. The lid 326 is fitted to the body 325 such that the pawls 333 engages the concavities 328 and the protrusions 329 of the body 325 is inserted through the corresponding holes 334. Thus the outer cylinder 2 is rotatable relative to the shaft 201, the inner cylinder 7 and the cylinder 67 in the directions A and B. The accommodating chamber 5 is formed between the outer and inner peripheral surfaces 411 and 412 of the inner cylinder 7 and the body 325, respectively.

In the present embodiment, the space maintaining member 315 includes a plurality of sectorial protrusions 355 integral with one end of the body 325, wherein the outer edges 356 of the protrusions 355 abut slidably on the inner peripheral surface 227 of the cylinder 67.

The parking brake 300, thus formed, operates in a manner similar to that of the parking brake 101, mentioned above.

In the brake 300, the protrusions 355 as the space maintaining member 315 are disposed between the outer cylinder 2 and the free annular end 314 of the cylinder 67 of the brake pedal 61 to maintain the spacing H between the outer cylinder 2 and the free end 314 of the cylinder 67. Thus, even if a force oblique to a vertical plane including the stepping-down direction is applied to the pedal arm 69, a great displacement of the free end 314 of the cylinder 67 which would otherwise occur is prevented, and hence possible excessive contact of the inner peripheral surface 227 of the cylinder 67 with the spring 9 during the rotation of the cylinder 67 and possible occurrence of foreign noise or the stepping-down resistance are prevented. Since in the brake 300 the protrusions 355 prevent the axial movement of the coil spring 9, so that slippage of the coil spring 9 from the outer cylinder 9 is prevented.

The reason why the free end 314 of the cylinder 67 is displaced greatly in the brake 300 is mainly a backlash involving the pedal arm 69, so that a clearance 450 between the cylinder 67 and the lid 326 and a clearance 451 between the lid 326 and the shaft 201 are required to be reduced in order to reduce the backlash in the pedal arm 69 itself. However, in the outer cylinder 2 where the protrusions 329 of the body 325 are inserted into the corresponding through holes 334 in the lid 326 so that the body 325 and lid 326 are prevented from rotation relative to each other in the directions A and B, a reduction in the spacings 450 and 451 would cause an interference between the lid 326 and the cylinder 67 or shaft 201 at high or low temperature due to the differences in thermal expansion between the lid 326 and the cylinder 67, or the shaft 201 and hence the large friction between these members to thereby result in a bad operation of the brake. Therefore, it is difficult to reduce greatly the spacing 450 and 451 in the outer cylinder 2 in consideration of the difference in thermal expansion. This problem occurs markedly when the cylinder 67 and shaft 201 are made of a metal and the outer cylinder 2 is made of a resin which is greatly different in thermal expansion from the metal.

In order to solve such problem, a parking brake 500 according to the present invention may be partly formed of an outer cylinder 520, as shown in FIGS. 17 to 20 in place of the cylinder 2 including the body 325 and the lid 326. The outer cylinder 520 as the forming member of the present embodiment is composed of a cylindrical body 523 with an annular groove 522 on its outer peripheral surface 521 around which the coil spring 9 is wound, and a lid 526 with a plurality of pawls 524 integral with the cylindrical larger diameter portion 525 thereof. The lid 526 is fitted into the annular groove 523 such that its pawls 524 are engaged in the annular groove 522. In the outer cylinder 520, the lid 526 is fitted into the body 523 by engagement of the pawls 524 with the annular groove 522 and not disengaged from the body 523 and the lid 526 is rotatable around the axis 6 relative to the body 523 in the directions A and B, unlike the lid 326. Therefore, by constructing the parking brake 500 using the outer cylinder 520 as the forming member, the body 523 and the lid 526 are rotated relative to each other in each of the directions A and B in the turning operation of the pedal arm 69 even if an interference occurs due to the difference in thermal expansion between the outer surface of the lid 526 and the inner surface of the cylinder 67 or between the outer surface of the shaft 201 and the inner surface of the cylindrical smaller diameter portion 527 of the lid 526 to thereby produce great friction between those members concerned, so that a danger of a malfunction such as is mentioned above is eliminated and the spacings 450 and 451 are reduced enough to thereby reduce a backlash involving the pedal arm 69 itself.

While in the parking brake 300 the space maintaining members 315 comprises a plurality of sectorial protrusions 355, it may be composed of an annular protrusion 530 integral with the body 523.

What is claimed is:

1. A foot-operated parking brake for a car, comprising:
    a frame;
    a brake pedal attached rotatably to the frame for movement from a home position by a stepping down stroke on the brake pedal and a return stroke to the home position;
    one forming member fixed to the frame for forming an accommodating chamber in which a viscous fluid is accommodated;
    other forming member disposed rotatably relative to the one forming member and forming the accommodating chamber in association with the one forming member;

a first coil spring connected at one end thereof to the brake pedal and disposed about the other forming member, the first coil spring being wound in a direction to slide relative to the other forming member in the stepping-down stroke of the brake pedal, and to contact the other forming member with high frictional resistance on the return stroke of the brake pedal to the home position;

a second coil spring connected at one end thereof to the frame and disposed at the brake pedal, the second coil spring being wound in a direction to loosely contact the brake pedal in the stepping-down stroke of the brake pedal, and to contact the brake pedal with high frictional resistance in the brake pedal return stroke to the home position;

a return spring stretched between the frame and the brake pedal to return the brake pedal to the home position by a resiliency of the return spring; and release means for releasing a contact of the second coil spring to the brake pedal with high frictional resistance.

2. A foot-operated parking brake for a car according to claim 1, wherein the frame comprises a shaft, the one forming member comprising an inner cylinder disposed fixedly to an outer peripheral surface of the shaft, the other forming member comprising an outer cylinder disposed at an outer peripheral surface of the inner cylinder, the accommodating chamber being formed between the outer peripheral surface of the inner cylinder and an inner peripheral surface of the outer cylinder, and the first coil spring being wound around an outer peripheral surface of the outer cylinder.

3. A foot-operated parking brake for a car according to claim 1, wherein the release means comprises a release lever attached rotatably to the frame, the lever being engaged at one end thereof with another end of the second coil spring on turning thereof to thereby expand or reduce a diameter of the second coil spring and hence release the contact of the second coil spring with the brake pedal with high frictional resistance, and an urging spring for urging the release lever by a resiliency thereof to release an engagement of the end of the release lever with the other end of the second coil spring.

4. A foot-operated parking brake for a car according to claim 2, wherein the release means comprises a release lever attached rotatably to the frame, the lever being engaged at one end thereof with an other end of the second coil spring on turning thereof to thereby expand or reduce a diameter of the second coil spring and hence release the contact of the second coil spring with the brake pedal with high frictional resistance, and an urging spring for urging the release lever by a resiliency thereof to release an engagement of the end of the release lever with the other end of the second coil spring.

5. A foot-operated parking brake for a car according to claim 3, wherein the release lever has an other end for connecting a release cable for turning the release lever against the resiliency of the urging spring.

6. A foot-operated parking brake for a car, comprising:

a frame having a shaft;

a brake pedal having a cylinder disposed outside and concentric to the shaft of the frame, and attached rotatably to the shaft of the frame for movement from a home position by a stepping down stroke on the brake pedal and a return stroke to the home position;

one forming member provided fixedly to the shaft of the frame for forming an accommodating chamber for receiving a viscous fluid;

other forming member forming the accommodating chamber in association with the one forming member, and disposed externally rotatable to the one forming member;

a coil spring having one end connected to the cylinder of the brake pedal and wound around an outer periphery of the other forming member to slide rotationally relative to the other forming member in the stepping-down stroke of the brake pedal, and to contact the other forming member with high frictional resistance in the return stroke of the brake pedal to home position;

a return spring stretched between the frame and the brake pedal for returning the brake pedal to the home position by a resiliency of the return spring; and space maintaining means disposed between a free end of the cylinder of the brake pedal and said other forming member for maintaining a space between the free end of the cylinder and the other forming member.

7. A foot-operated parking brake for a car according to claim 6, wherein the space maintaining means comprises a protrusion projecting from the other forming member.

* * * * *